US008728663B2

(12) United States Patent
Niwa et al.

(10) Patent No.: US 8,728,663 B2
(45) Date of Patent: May 20, 2014

(54) POSITIVE ELECTRODE FOR LITHIUM-ION SECONDARY BATTERY AND LITHIUM-ION SECONDARY BATTERY COMPRISING THAT POSITIVE ELECTRODE

(75) Inventors: Junichi Niwa, Kariya (JP); Kazuaki Hokano, Kariya (JP); Masataka Nakanishi, Kariya (JP); Akira Kojima, Kariya (JP); Kazuhito Kawasumi, Kariya (JP); Takuhiro Miyuki, Ikeda (JP); Tetsuo Sakai, Ikeda (JP)

(73) Assignees: Kabushiki Kaisha Toyota Jidoshokki, Aichi (JP); National Institute of Advanced Industrial Science and Technology, Tokyo (JP)

( * ) Notice: Subject to any disclaimer, the term of this patent is extended or adjusted under 35 U.S.C. 154(b) by 0 days.

(21) Appl. No.: 13/639,409

(22) PCT Filed: Apr. 12, 2011

(86) PCT No.: PCT/JP2011/002171
§ 371 (c)(1),
(2), (4) Date: Oct. 4, 2012

(87) PCT Pub. No.: WO2011/129103
PCT Pub. Date: Oct. 20, 2011

(65) Prior Publication Data
US 2013/0029222 A1    Jan. 31, 2013

(30) Foreign Application Priority Data
Apr. 16, 2010   (JP) .................................. 2010-095244

(51) Int. Cl.
H01M 4/60        (2006.01)
(52) U.S. Cl.
USPC .......................................... 429/213; 429/217

(58) Field of Classification Search
None
See application file for complete search history.

(56) References Cited

U.S. PATENT DOCUMENTS 6,001,507 A    12/1999  Ono et al.
2011/0200875 A1  8/2011  Miyuki et al.

FOREIGN PATENT DOCUMENTS

| JP | 10-188992 A | 7/1998 |
| JP | 2002-154815 A | 5/2002 |
| JP | 2006-253450 A | 9/2006 |
| WO | 2010/044437 A1 | 4/2010 |

OTHER PUBLICATIONS

WO 2010/044437 (a raw machine translation).*
Yoshio Uetani, "Polymer Lithium Battery", CMC Inc., 1999, pp. 137-147.
Xian-Guo Yu et al., "Lithium Storage in Conductive Sulfur-Containing Polymers", Journal Electroanalytical Chemistry, Jul. 27, 2004, pp. 121-128, vol. 573.

* cited by examiner

*Primary Examiner* — Milton I Cano
*Assistant Examiner* — Carmen Lyles-Irving
(74) *Attorney, Agent, or Firm* — Sughrue Mion, PLLC

(57) ABSTRACT

To provide a sulfur-system positive electrode for lithium-ion battery, sulfur-system positive electrode which is good in the cyclability and the other characteristics, and a lithium-ion secondary battery including that positive electrode. In a positive electrode for lithium-ion secondary battery, the positive electrode having: a current collector; and an electrode layer that is formed on a surface of the current collector, and which includes a binder resin, an active material and a conductive additive, the positive electrode is characterized in that the active material includes a sulfur-modified polyacrylonitrile that is produced by heating a raw-material powder including a sulfur powder and a polyacrylonitrile powder in an enclosed nonoxidizing atmosphere; and the binder resin includes a polyimide resin and/or a polyamide-imide resin.

8 Claims, 5 Drawing Sheets

POSITIVE ELECTRODE FOR LITHIUM-ION SECONDARY BATTERY AND LITHIUM-ION SECONDARY BATTERY COMPRISING THAT POSITIVE ELECTRODE

CROSS REFERENCE TO RELATED APPLICATIONS

This application is a National Stage of International Application No. PCT/JP2011/002171 filed on Apr. 12, 2011, which claims priority from Japanese Patent Application No. 2010-095244, filed on Apr. 16, 2010, the contents of all of which are incorporated herein by reference in their entirety.

TECHNICAL FIELD

The present invention is one which relates to a positive electrode for lithium-ion secondary battery, and to a lithium-ion secondary battery comprising that positive electrode.

BACKGROUND ART

A lithium-ion secondary battery is a secondary battery whose charged and discharged capacities are high, and which makes it feasible to output high power. At present, lithium-ion secondary batteries have been used as the power source for portable electronic appliances. Furthermore, it is expected to be the power source for electric automobiles that have been predicted to become widely used from now on. However, when using them for these applications, in particular, when using them as a power source for automobile, it has been sought for cutting down their costs and making them more likely to save space. Moreover, as for the use for portable electric appliances, their current major application, it has been desired to make them much shorter, smaller, lighter and thinner.

In lithium secondary batteries that have been employed currently, those which use rare resources, such as cobalt and nickel that are called rare metals, as the positive-electrode electrode material, make a mainstream. Consequently, battery materials, which are more advantageous in view of resourcefulness, have been desired.

Sulfur is a material that is abundant and inexpensive in view of resourcefulness. Besides, sulfur is a material that theoretically exhibits the maximum electric capacity among known positive-electrode materials when it is used as a positive-electrode active material for lithium-ion secondary battery. From Sulfur, it is believed that an electric capacity is obtainable, electric capacity which is larger by about six times, compared with those obtainable from lithium cobaltate positive-electrode materials that have been employed mostly among currently commercially-available positive-electrode materials. Consequently, it has been desired to put sulfur into practical use as a positive-electrode material.

However, compounds of sulfur and lithium are soluble in non-aqueous-system solvents, such as ethylene carbonate and dimethyl carbonate, which have been used as the non-aqueous-system electrolytic solution for lithium-ion secondary battery. Consequently, when compounds of sulfur and lithium are used as a positive-electrode material, there is such a problematic issue that the resulting positive electrodes deteriorate gradually and hence the resultant battery capacities decline because the compounds of sulfur and lithium elute into electrolytic solutions. Moreover, in order to inhibit compounds of sulfur and lithium from eluting into electrolytic solutions, reports have been made on using polymer electrolytes or solid electrolytes. However, since batteries, in which polymer electrolytes or solid electrolytes are used, exhibit high internal resistances and are less likely to be activated or operated at room temperature or lower temperatures, it is necessary to activate or operate them at higher temperatures. Moreover, batteries, in which polymer electrolytes or solid electrolytes are used, also associate with such a problem that the outputs are low, and so forth.

Therefore, when a sulfur-containing material can be realized practically as a positive-electrode material for lithium-ion secondary battery by suppressing the elution of sulfur into non-aqueous-system solvents, it is possible to realize increasing the resulting capacity of lithium-ion secondary battery, and making the resultant lithium-ion secondary more light-weight as well as more likely to save space. Moreover, when it is possible to use, not polymer electrolytes or solid electrolytes, but an electrolytic solution comprising a non-aqueous-system solvent, it becomes feasible to activate or operate the resulting lithium-ion secondary battery at room temperature, or even at lower temperatures.

As one of the attempts to suppress the elution of sulfur into non-aqueous-system solvents, a sulfur-system polymeric substance, which is linked one after another by —CS—CS— bonds and —S—S— bonds, has been proposed (see Non-patent Literature No. 1 mentioned below). However, in a case where this sulfur-system polymeric substance is used as a positive-electrode material, the polymer has been cut off because Li and S bond with each other at the time of discharging. Consequently, the reversibility of reaction has lost, and so the cyclability of the resulting battery has declined.

Moreover, in Patent Literature No. 1 mentioned below, there is set forth a carbon polysulfide whose major components are carbon and sulfur. It is allegedly said that this carbon polysulfide is satisfactory in stability and is good in the resulting charge/discharge cyclability. However, as set forth in Example No. 9 in which an aluminum foil was used as the current collector, for instance, it cannot be said that the resultant cyclability was improved sufficiently because the resulting discharged capacity, which showed 610 mAh/g per active material at the 10th cycle of charging and discharging operations, had deteriorated down to 146 mAh/g at the 50th cycle. As causes of this declining in the discharged capacity, it is possible to believe as follows: since the carbon polysulfide has a structure which is made by adding sulfur to straight-chain unsaturated polymers, the —CS—CS— bonds and the —S—S— bonds are cut off easily during the charging/discharging cycles; and hence the polymers have turned into low molecular-weight substances to dissolve in the electrolytic solution.

Moreover, in addition to those mentioned above, investigations for upgrading the cyclability of lithium-ion secondary battery have been recently carried out variously by means of loading sulfur onto supports such as carbon. However, when investigations on the cyclabilities of batteries having these supports were carried out using a binder resin (e.g., polyvinylidene fluoride (or PVDF)) that has been usually used at present, it was understood that the discharged capacities of the resulting batteries have declined.

It was understood that a cause of this declining in the discharged capacities is that the resistances within the resulting electrodes become larger due to the changes in the states of active material (e.g., expansions, and the like), changes which take place in the process of cyclic tests when PVDF is used. Although it has been unclear what causes this increase in the resistances, as one of the possibilities, it is possible to believe as follows: conductive paths being formed of conductive additives are cut off by means of the expansions of active materials; as a result, the resistances increase.

Patent Literature No. 1: Japanese Unexamined Patent Publication (KOKAI) Gazette No. 2002-154,815; and Non-patent Literature No. 1: "Polymer Lithium Battery," Written by UETANI Yoshio, and Published by CMC Co., Ltd.

DISCLOSURE OF THE INVENTION

Assignment to be Solved by the Invention

The present invention is one which has been done in view of the above-mentioned circumstances of the conventional technologies. Its major object is to put sulfur, which is a low-cost material and from which high capacities can be expected, into practical use as a positive-electrode material for lithium-ion secondary battery. In particular, it is another object to provide a sulfur-system positive electrode for lithium-ion secondary battery, sulfur-system positive electrode which is good in cyclability and the other characteristics and besides in which ordinary non-aqueous-system electrolytic solutions are employable, as well as to provide a lithium-ion secondary battery comprising that positive electrode.

Means for Solving the Assignment

The present inventors have been earnestly making studies repeatedly in order to accomplish the above-mentioned objects. As a result, they found that polyacrylonitrile, which has been modified by means of sulfur, is obtainable by means of mixing a sulfur powder with a polyacrylonitrile powder and then heating the resulting mixture in a nonoxidizing atmosphere under such conditions that can prevent sulfur from flowing out, because the vapors of sulfur react with polyacrylonitrile simultaneously with the ring-closing reactions of polyacrylonitrile . And, when sulfur-modified polyacrylonitriles being obtained by this method are used in positive electrodes for lithium-ion secondary battery, the elution of sulfur into non-aqueous-system solvents can be suppressed in addition to maintaining the high capacity that sulfur exhibits inherently. Consequently, they found out that lithium-ion secondary batteries, in which sulfur-modified polyacrylonitriles being obtained by this method are used, exhibit good cyclability.

Moreover, they found out the following: including a polyimide resin and/or a polyamide-imide resin in binder resins of positive-electrode materials for lithium-ion secondary battery makes it possible to inhibit active materials from coming off or falling down from current collectors, which arises from the expansions of the active materials, and then resulting in cutting off conductive paths being formed of conductive additives; and lithium-ion secondary batteries comprising those positive electrodes for lithium-ion secondary battery exhibit good performance in the cyclability. The present invention is one which has been done as a result of further making studies repeatedly based on the knowledge of these.

Specifically, as represented in following article (1) through (7), the present invention is one which provides a positive electrode for lithium-ion secondary battery, positive electrode which uses a sulfur-modified polyacrylonitrile for a positive-electrode active material, and which uses a polyimide resin and/or a polyamide-imide resin for a binder resin; as well as one which provides a lithium-ion secondary battery comprising that positive electrode.

(1) In a positive electrode for lithium-ion secondary battery, the positive electrode having: a current collector; and an electrode layer that is formed on a surface of the current collector, and which includes a binder resin, an active material and a conductive additive, the positive electrode being characterized in that:

the active material includes a sulfur-modified polyacrylonitrile that is produced by heating a raw-material powder comprising a sulfur powder and a polyacrylonitrile powder in an enclosed nonoxidizing atmosphere; and the binder resin includes a polyimide resin and/or a polyamide-imide resin.

(2) The positive electrode for lithium-ion secondary battery as set forth in aforementioned article (1), wherein the aforementioned binder resin includes a polyimide resin and/or a polyamide-imide resin in an amount of 50% by mass or more.

(3) The positive electrode for lithium-ion secondary battery as set forth in abovementioned article (1) or (2), wherein a temperature of aforementioned heating is 250-500° C.

(4) The positive electrode for lithium-ion secondary battery as set forth in abovementioned article (3), wherein aforementioned active material is one from which unreacted sulfur has been removed by further heating aforementioned sulfur-modified polyacrylonitrile, which has been produced, at 150-400° C. in a nonoxidizing atmosphere after aforementioned heating.

(5) The positive electrode for lithium-ion secondary battery as set forth in any of aforementioned articles (1) through (4), wherein aforementioned sulfur-modified polyacrylonitrile exhibits the following in a Raman spectrum in a range of 200 $cm^{-1}$-2,000 $cm^{-1}$ according to the Raman shift:

a major peak existing at around 1,330 $cm^{-1}$; and other peaks existing at around 1,561 $cm^{-1}$, 1,512 $cm^{-1}$, 1,447 $cm^{-1}$, 1,150 $cm^{-1}$, 996 $cm^{-1}$, 942 $cm^{-1}$, 802 $cm^{-1}$, 474 $cm^{-1}$, 391 $cm^{-1}$, 365 $cm^{-1}$, and 305 $cm^{-1}$.

(6) The positive electrode for lithium-ion secondary battery as set forth in any of aforementioned articles (1) through (5), wherein aforementioned binder resin includes at least one of the following:

at least one of a polymer being selected from the group consisting of polyvinylidene fluoride, polytetrafluoroethyelen, styrene-butadiene rubber, amorphous polyether, polyacrylamide, poly-N-vinylacetamide, polypropylene, polyethylene, polyaniline, and polypyrole;

a constituent monomer of aforementioned polymer; and a copolymer of aforementioned constituent monomer and another monomer; as well as a compound being formed by means of crosslinking any of aforementioned polymer, aforementioned constituent monomer, and aforementioned copolymer.

(7) A lithium-ion secondary battery comprising the positive electrode asset forth in any of aforementioned (1) through (6).

Effect of the Invention

In the positive electrode for lithium-ion secondary battery according to the present invention, the elution of sulfur into non-aqueous-system solvents can be suppressed, in addition to maintaining the high capacity that sulfur exhibits inherently, because the aforementioned sulfur-modified polyacrylonitrile is included in the active material.

Moreover, in the positive electrode for lithium-ion secondary battery according to the present invention, sulfur, a material that is inexpensive and abundant in view of resourcefulness, can be adaptable into a raw material, because the aforementioned sulfur-modified polyacrylonitrile is adapted into the active material. Moreover, the above-mentioned sulfur-polyacrylonitrile has high practicality industrially, because it can be produced by such a process, which can be easily scaled up, as heat-treating the raw material within an enclosed reactor container.

Moreover, when the sulfur-modified polyacrylonitrile is used as a positive-electrode active material, since the sulfur-modified polyacrylonitrile exhibits a lower chargeable potential, it is possible to use a polyimide resin and/or a polyamide-imide resin as a binder resin for positive electrode.

Since the positive electrode for lithium-ion secondary battery according to the present invention includes a polyimide resin and/or a polyamide-imide resin in the binder resin, it is possible to suppress the active material from being come off or fallen down from the current collector, due to the expansions of the active material, to result in cutting off conductive passes being formed of the conductive additive. Since it combinedly possesses a constitution, including the aforementioned sulfur-modified polyacrylonitrile in the active material, and another constitution, including a polyimide resin and/or a polyamide-imide resin, a lithium-ion secondary battery, in which the positive electrode for lithium-ion secondary battery according to the present invention is used, exhibits excellent cyclability.

Moreover, it is also allowable to make the aforementioned binder resin by admixing at least one of the following in an adequate amount: at least one of a polymer being selected from the group consisting of polyvinylidene fluoride, polytetrafluoroethyelen, styrene-butadiene rubber, amorphous polyether, polyacrylamide, poly-N-vinylacetamide, polypropylene, polyethylene, polyaniline, and polypyrole; a constituent monomer of aforementioned polymer; and a copolymer of aforementioned constituent monomer and another monomer; as well as a compound being formed by means of crosslinking any of aforementioned polymer, aforementioned constituent monomer, and aforementioned copolymer. The flexibility of the resulting electrode layer increases by including such a flexible component in the binder resin. Therefore, it is possible to apply a positive electrode for lithium-ion secondary battery, positive electrode which has such a flexible electrode layer, even to wound batteries as well.

A lithium-ion secondary battery comprising the aforementioned positive electrode for lithium-ion secondary battery exhibits excellent cyclability.

BEST MODES FOR CARRYING OUT THE INVENTION

Positive Electrode for Lithium-ion Secondary Battery

Figure 1:
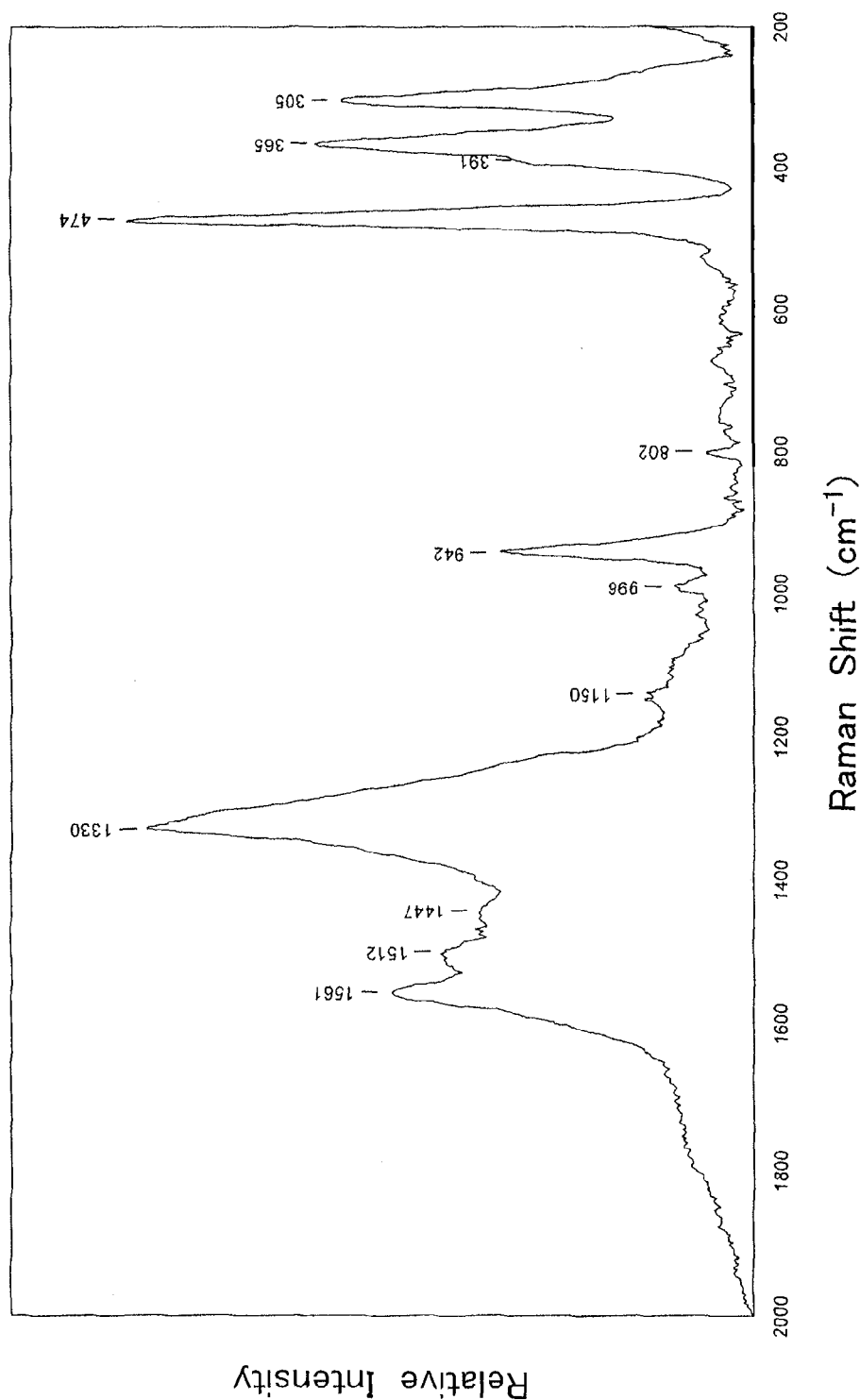
FIG. 1 is a diagram that illustrates a Raman spectrum of a sulfur-modified polyacrylonitrile that was used in Example No. 1.

A positive electrode for lithium-ion secondary battery according to the present invention comprises a current collector, and an electrode layer that is formed on a surface of the current collector, and which includes a binder resin, an active material, and a conductive additive.

Active Material

The "active material" refers to a substance that contributes directly to electrode reactions, such as charging reactions and discharging reactions.

An active material being used in the present invention includes a sulfur-modified polyacrylonitrile that is produced by heating a raw-material powder comprising a sulfur powder and a polyacrylonitrile powder in an enclosed nonoxidizing atmosphere. Explanations will be made hereinafter on the sulfur-modified polyacrylonitrile in detail.

(1) Raw Materials for Sulfur-modified Polyacrylonitrile

As for raw materials, a sulfur powder, and a polyacrylonitrile powder are used in the present invention.

Although there are not any limitations on a particle diameter of the sulfur powder especially, those having a particle diameter that falls in a range of 150 µm-40 µm approximately are preferable, or those having a particle diameter that falls in a range of 100 µm-40 µm approximately are more preferable, when being classified with use of sieve. When a particle diameter of the sulfur powder is 150 µm or less, reactivity of the resulting raw-material powder enhances, and hence it is possible to obtain a uniform sulfur-modified polyacrylonitrile more quickly. Moreover, when a particle diameter of the sulfur powder is smaller than 40 µm, handling properties worsen.

As for a polyacrylonitrile powder, those whose weight average molecular weight falls in a range of 10,000-300,000 approximately are preferable. Moreover, as to a particle diameter of the polyacrylonitrile powder, those having a particle diameter that falls in a range of 0.5-50 µm approximately are preferable, or those having a particle diameter that falls in a range of 1-10 µm approximately are more preferable, when being observed by means of electron microscope. When a particle diameter of the polyacrylonitrile powder is 50 µm or less, reactivity of the resulting raw-material powder enhances, and hence it is possible to obtain a uniform sulfur-modified polyacrylonitrile more quickly. Moreover, when a particle diameter of the polyacrylonitrile powder is smaller than 0.5 µm, handling properties worsen.

Moreover, as a particle diameter of the polyacrylonitrile powder becomes larger, cyclabilities of the resulting batteries worsen. Although the reason has not been clear yet why cyclabilities of the resultant batteries worsen as a particle diameter of the polyacrylonitrile powder becomes larger, it is presumed as follows. Although a production process for the sulfur-modified polyacrylonitrile will be explained below, it is presumed that molten sulfur permeates into a polyacrylonitrile powder in the course of the production. Consequently, it is presumed that the smaller a particle diameter of the polyacrylonitrile is the more likely it is that molten sulfur permeates into the polyacrylonitrile powder so that it is possible to obtain a uniform sulfur-modified polyacrylonitrile.

As to a blending proportion between the sulfur powder and the polyacrylonitrile powder, it is not restrictive especially. However, it is preferable to set the sulfur powder at 50-1,000 parts by mass approximately, more preferably at 50 to 500 parts by mass approximately, or much more preferably at 150-350 parts by mass approximately, with respect to the polyacrylonitrile power being taken as 100 parts by mass. When a blending proportion between the sulfur powder and the polyacrylonitrile powder falls in the aforementioned ranges, it is presumed that molten sulfur is likely to permeate into the polyacrylonitrile powder so that it is possible to obtain a uniform sulfur-modified polyacrylonitrile.

(2) Production Process for Sulfur-modified Polyacrylonitrile

In a production for the sulfur-modified polyacrylonitrile being used in the present invention, the above-mentioned sulfur powder and polyacrylonitrile powder are used as a raw-material powder, and then the resulting raw-material powder is heated in an enclosed nonoxidizing atmosphere. Thus, sulfur in vapor state reacts with polyacrylonitrile at the same time as the ring-closing reactions of polyacrylonitrile, and thereby polyacrylonitrile being modified by means of sulfur is obtainable.

An "enclosed atmosphere" refers to such an atmosphere that an enclosed state is kept to such an extent that sulfur is prevented from flowing out and the vapors of sulfur being generated by heating do not dissipate.

Moreover, a "nonoxidizing atmosphere" refers to an atmosphere in depressurized state whose oxygen concentration is made lower to such an extent that oxidation reactions do not proceed, or a sulfur-gas atmosphere; alternatively, to an inert-gas atmosphere, such as nitrogen or argon, and the like.

Although there are not any limitations especially on a specific method for heating the raw-material powder in a nonoxidizing atmosphere under enclosed condition, it is allowable to put the raw-material powder into a container whose state of enclosure is kept to such an extent that sulfur vapors do not dissipate, and then to heat it after turning the inside of the container into a depressurized condition or an inert-gas atmosphere, for instance. In addition, it is also permissible to heat a mixture of a sulfur powder and a polyacrylonitrile powder under such a condition that it is vacuum-packed by a packing material comprising a material such as aluminum laminated films that do not react with the vapors of sulfur. In this case, it is preferable to heat the raw-material powder, which is vacuum-packed by the packing material, within a pressure-resistant container, such as an autoclave, which is enclosed after filling it with water, for instance, in order that the packing material is not damaged by means of sulfur vapors that are generated. In accordance with this method, it is possible to prevent the packing material from swelling to be damaged by means of the sulfur vapors, because the packing material is pressurized from the outside by means of water vapors that are generated.

Upon heating the raw-material powder comprising a sulfur powder and a polyacrylonitrile powder, although it is also allowable to heat a mixture that is made only by simply mixing the two powders, it is even permissible to heat a formed body that is obtained by forming that mixture as a pelletized shape, for instance.

It is preferable to set a heating temperature at 250-500° C. approximately, and it is more preferable to set it at 250-400° C. approximately. When the heating temperature is not 250° C. or more, reactions between sulfur and polyacrylonitrile do not occur; whereas the elimination of sulfur occurs so that the sulfur content within the resulting sulfur-modified polyacrylonitrile declines when the heating temperature exceeds 500° C. When the sulfur content declines, the electric capacities of the resultant batteries come to decline. Moreover, the finished or completed sulfur-modified polyacrylonitrile can hardly be decomposed by means of this heating temperature at the time of the production.

As to a heating time, although it is not limited especially and depends on actual heating temperatures, it is allowable usually to retain the mixture within the above-mentioned temperature range for 10 minutes-10 hours approximately, and it is preferable to retain it within the temperature range for 30 minutes-6 hours approximately. In accordance with the present process, it is feasible to form sulfur-modified polyacrylonitriles in such a short period of time.

In accordance with the above-mentioned process, the ring-closing reactions of polyacrylonitrile and the reactions between sulfur and polyacrylonitrile occur simultaneously, and thereby polyacrylonitriles, which have been modified by means of sulfur, are obtainable.

(3) Characteristics of Sulfur-modified Polyacrylonitriles

When the thus obtained sulfur-modified polyacrylonitriles undergo an elemental analysis, it makes those which include carbon, nitrogen and sulfur, and which further include a small amount of oxygen and hydrogen. It is preferable that their composition can be made up of carbon: 40-60% by mass, sulfur: 15-30% by mass, nitrogen: 10-25% by mass, and hydrogen: 1-5% by mass.

It is preferable that sulfur-modified polyacrylonitriles being directed to the present invention can preferably exhibit characteristics as being represented hereinafter. Specifically, it is preferable that a weight reduction, which results from a thermogravimetric analysis upon heating one of the sulfur-modified polyacrylonitriles from room temperature to 900° C. at a temperature increment rate of 20° C./min., can be 10% or less at the time of 400° C. On the other hand, when a mixture of a sulfur powder and a polyacrylonitrile powder is headed under the same conditions, a weight reduction is recognizable from at around 120° C., and then a larger weight reduction, which results from the disappearance of sulfur, is suddenly recognizable when being 200° C. or more.

Furthermore, in the sulfur-modified polyacrylonitriles, it is preferable that, as a result of X-ray diffraction by means of the CuK α ray, the peak resulting from sulfur can be disappeared and only a broad peak can be ascertained at a diffraction angle (2θ) that falls in the vicinity of 20-30°.

Specifically, in the sulfur-modified polyacrylonitriles, it is preferable that sulfur cannot exist as the simple substance, but can exist in such a state that it has bonded with polyacrylonitriles in which the ring closures have proceeded.

It is preferable that the sulfur-modified polyacrylonitiriles can exhibit the following in a Raman spectrum in a range of 200 $cm^{-1}$-2,000 $cm^{-1}$ according to the Raman shift: a major peak existing at around 1,330 $cm^{-1}$; and other peaks existing at around 1,561 $cm^{-1}$, 1,512 $cm^{-1}$, 1,447 $cm^{-1}$, 1,150 $cm^{-1}$, 996 $cm^{-1}$, 942 $cm^{-1}$, 802 $cm^{-1}$, 474 $cm^{-1}$, 391 $cm^{-1}$, 365 $cm^{-1}$, and 305 $cm^{-1}$.

As to the above-mentioned peaks according to the Raman shift, it is preferable that they can be those which are observed at similar peak positions even in a case where the ratio of sulfur atoms with respect to polyacrylonitrile is altered. Therefore, these peaks are those which characterize the sulfur-modified polyacrylonitriles being used in the present process. Not that it is preferable that each of the above-mentioned peaks can exist within a range of 5 cm$^{-1}$ that centers around the above-mentioned peak positions, respectively.

When the sulfur-modified polyacrylonitriles are used as a positive-electrode active material for lithium-ion secondary battery, this lithium-ion secondary battery becomes one which shows high capacity, because the sulfur-modified polyacrylonitiriles contain sulfur. Since the electric capacity of this positive-electrode active material reaches as high as 600 mAh/g, the value of this electric capacity is one which shows a high capacity that is about 4 times as much as the electric capacity of conventional positive-electrode material in which $LiCoO_2$ is used.

The ring-closing reactions, which take place in a case where polyacrylonitrile, one of the raw-material substances, is heated, possess such a characteristic that they proceed while forming condensed rings three-dimensionally. Consequently, sulfur-modified polyacrylonitrile structures, in which polyacrylonitriles have been crosslinked three-dimensionally, are formed by mixing polyacrylonitrile with sulfur and then heating them. Therefore, when the sulfur-modified polyacrylonitriles being obtainable by the above-mentioned process are used a positive-electrode active material, it is possible to suppress the elution of sulfur active material into electrolytic solutions in charging/discharging cycles.

When the sulfur-modified polyacrylonitriles are used as a positive-electrode active material, the sulfur is suppressed from eluting into the non-aqueous-system electrolytic solutions so that the cyclic longevity of the battery upgrades. Not only that, but it becomes feasible to manufacture a battery by using conventional non-aqueous-system electrolytic solutions for lithium-ion secondary battery, because the elution of sulfur into the non-aqueous-system electrolytic solutions is suppressed. Therefore, using the sulfur-modified polyacrylonitriles as a positive-electrode active material is of great value practically.

(4) Heat Treatment of Sulfur-modified Polyacrylonitriles

Even in the sulfur-modified polyacrylonitriles being obtainable by the above-mentioned process, there might arise cases where unreacted sulfur remains. It is possible to remove unreacted sulfur by means of heat-treating the sulfur-modified polyacrylonitriles having been obtained by the above-mentioned process in a nonoxidizing atmosphere. Thus, it is possible to obtain the polyacrylonitriles with much higher purity. When the post-heat-treatment sulfur-modified polyacrylonitriles are used for a positive-electrode active material, the charging/discharging cyclability of the resulting battery upgrades much more.

As for a preferable nonoxidizing atmosphere, it is possible to give the following: depressurized states whose oxygen concentration is reduced to such an extent that oxidation reactions do not proceed; alternatively inert-gas atmospheres, such as nitrogen or argon; for instance.

It is preferable to set a temperature of the heat treatment at 150-400° C. approximately; it is more preferable to set it at 150-300° C. approximately; and it is much more preferable to set it at 200-300 ° C. approximately. Since the resulting sulfur-modified polyacrylonitriles might possibly decompose when the temperature of the heat treatment becomes too high, it is necessary to take care of not making it happen. Although a heat-treatment time is not restrictive especially, it is usually preferable to set it for 1-6 hours approximately.

Current Collector

The "current collector" refers to a chemically-inactive highly-electron-conductive body for keeping electric current flowing to electrodes during discharging or charging. Although it is possible to adopt such a configuration as a foil or plate, and the like, for the current collector, the configuration is not at all limited especially as far as it is a configuration that fits for the objective. The following, which have been heretofore employed conventionally as a current collector for lithium-ion secondary battery, can be used: aluminum foils, copper foils, aluminum meshes, stainless-steel meshes, or copper meshes, and the like, for instance.

Moreover, the sulfur-modified polyacrylonitriles being used as an active material in the present invention are employed in such a relatively low potential region as 1-3 V approximately. In the case of conventional batteries in which lithium cobaltate makes the active material, nickel cannot be employed as the current collector, because the employable potential region of lithium cobaltate is high. This results from the fact that there arises such a possibility that current collectors in which nickel is used might dissolve during the service due to the high employable potential region. In the present invention, current collectors, in which nickel makes the material, can be employed. For example, foamed nickel, or nickel unwoven fabrics, and the like, are employable as a current collector. Moreover, carbon nonwoven fabrics, or carbon woven fabrics, and so forth, can also be employed as a current collector.

Conductive Additive

The conductive additive is added in order to enhance the electrode layer in the electric conductivity. As for a conductive additive, it is possible to use one of the following, namely, carbonaceous fine particles: carbon black, graphite, acetylene black (or AB), KETJENBLACK (or KB), or gas-phase-method carbon fibers (or vapor grown carbon fibers (or VGCF)), and the like, independently; or to combine two or more species of them to employ.

As to an employment amount of the conductive additive, although it is not restrictive especially, it is possible to set the conductive additive in an amount of 5-100 parts by mass with respect to the sulfur-modified polyacrylonitriles being taken as 100 parts by mass.

Binder Resin

A binder resin is used as a binding agent for fixing an active material and a conductive additive onto a current collector. The binder resin according to the present invention includes a polyimide resin and/or a polyamide-imide resin. A polyimide resin and polyamide-imide resin are high in the heat resistance, and are high in the binding property. Consequently, it is possible to adapt the resulting positive electrode into one with longer longevity whose heat resistance is high by means of including a polyimide resin or polyamide-imide resin in the binder resin. Since a polyimide resin is higher in the heat resistance and is higher in the binding property than is a polyamide-imide resin, it is especially preferable that the binder resin can include a polyimide resin.

As a binder resin for positive electrode, fluorine-system resins have been heretofore used conventionally in order to endure high potentials. The positive electrode for lithium-ion secondary battery according to the present invention uses one of the sulfur-modified polyacrylonitriles for an active material. When using the sulfur-modified polyacrylonitriles for an active material, the resulting chargeable potentials are 3 V approximately at the highest although the resultant capacities are high.

Consequently, other than the fluorine-system resins, resins, which are endurable to a chargeable potential of 3 V approximately, are employable as a binder resin. Among them, it is possible to enhance the binding property of active material onto current collectors by means of containing a polyimide resin and/or a polyamide-imide resin in a binder resin when compared with using the fluorine-system resins.

When a binder resin includes a polyimide resin and/or a polyamide-imide resin even in a small amount, the binding property of active material onto current collectors upgrades. If a binder resin includes a polyimide resin and/or a polyamide-imide resin in an amount of 50% by mass or more when the entire binder resin is taken as 100% by mass, it is possible to effectively upgrade the binding property of active material onto current collectors. It is allowable that a binder resin can include a polyimide resin and/or a polyamide-imide resin preferably in an amount of 70% by mass or more; more preferably in an amount of 80% by mass or more; much more preferably in an amount of 90% by mass or more. When looking at this from a viewpoint of the binding property, it is preferable that a binder resin can include a polyimide resin and/or a polyamide-imide resin in an amount of 100% by mass.

Moreover, although it is not at all restrictive on an employment amount of the binder resin either, it is possible to set so that the binder resin can make 2-20 parts by mass approximately with respect to the sulfur-modified polyacrylonitriles in an amount of 100 parts by mass, for instance.

Moreover, it is also allowable that the binder resin according to the present invention can include at least one of the following: a specific polymer; a constituent monomer of this polymer; and a copolymer of this constituent monomer and another monomer; as well as a compound being formed by means of crosslinking any of the aforementioned monomer, the aforementioned constituent monomer and the aforementioned copolymer. It is preferable that the aforementioned polymer can be at least one that is selected from the group consisting of polyvinylidene fluoride, polytetrafluoroethylene, styrene-butadiene rubber, amorphous polyether, polyacrylamide, poly-N-vinylacetamide, polypropylene, polyethylene, polyaniline, and polypyrole.

An electrode layer, which includes the aforementioned polyvinilidene fluoride and the like as a binder resin, possesses much greater flexibility, compared with that of an electrode layer, which includes a polyimide resin and/or a polyamide-imide resin in an amount of 100% by mass.

A positive electrode, which comprises such an electrode layer whose flexibility is greater, becomes advantageous when being wound. Therefore, it becomes feasible to apply a positive electrode, in which the aforementioned resins are used as a binder resin, even to wound batteries as well.

As blending proportions in the binder resin, it is also allowable to blend the aforementioned polyvinylidene fluoride and the like in an amount of 10-100 parts by mass with respect to a polyimide resin and/or a polyamide-imide resin in an amount of 100 parts by mass. Although the greater the aforementioned polyvinylidene fluoride and so forth are blended in terms of the blending proportions in the binder resin the more cyclability of the re suiting battery declines, it is possible to give more flexibility to the resultant positive electrode.

Lithium-ion Secondary Battery

A lithium-ion secondary battery according to the present invention comprises the aforementioned positive electrode.

A lithium-ion secondary battery using the above-mentioned positive electrode for lithium-ion secondary battery can be manufactured by means of publicly-known methods. A lithium-ion secondary battery comprises a positive electrode, a negative electrode, and an electrolytic solution; and further comprises the other publicly-known battery constituent elements, if needed; and so it is possible to follow ordinary methods to assemble it. For example, it is possible to employ the above-mentioned positive electrode as the positive electrode; and to employ publicly-known metallic lithium, carbon-system materials, such as graphite, silicon-system materials, such as silicon thin films, and alloy-system materials, such as copper-tin and cobalt-tin, as an active-material material for the negative electrode. As an electrolytic solution, it is possible to employ a solution in which a lithium salt, such as lithium perchlorate, $LiPF_6$, $LiBF_4$ or $LiCF_3SO_3$, is dissolved in a publicly-known non-aqueous-system solvent, such as ethylene carbonate, dimethyl carbonate, propylene carbonate or dimethyl carbonate, in a concentration of from 0.5 mol/L to 1.7 mol/L approximately.

Note that, in a case where materials that do not include any lithium, namely, materials like the carbon-system materials, silicon-system materials or alloy-system materials of the above-mentioned active-material substances for negative electrode, are used as an active-material substance for the negative electrode, it is advantageous in such a perspective that short circuits, which result from the occurrence of dendrite, are less likely to occur between the positive and negative electrodes.

However, in a case where these active-material substances for negative electrode that do not include any lithium are used, a treatment for pre-doping a negative electrode with lithium in advance becomes necessary, because neither a positive electrode nor a negative electrode includes lithium at all when the active-material substances for negative electrode are combined with the positive electrode according to the present invention to use.

As for a method of pre-doping with lithium, it is allowable to follow publicly-known methods. In a case where a negative electrode is doped with lithium, it is possible to use the following methods, and so forth: methods of inserting lithium by means of electrolytic doping process in which a half cell is assembled as the counter electrode using metallic lithium and is then doped with lithium electrochemically; and methods of inserting lithium by means of stick-on pre-doping process in which an electrode is left in an electrolytic solution, after metallic lithium has been put on the electrode's surface or filled into the electrode, and is then doped with lithium by utilizing the lithium's diffusion into the electrode. After a negative electrode has been doped with lithium, it is permissible to constitute a lithium-ion secondary battery by combining the resulting negative electrode with the counter electrode.

As active-material substances for negative electrode that do not include any lithium, silicon-system materials exhibiting high-capacity electric capacities are preferable especially.

Production Process for Positive Electrode for Lithium-ion Secondary Battery

A process for producing the positive electrode for lithium-ion secondary battery according to the present invention includes an application step, and a curing step.

The application step is a step of mixing the binder resin with an active material and a conductive additive and further adding a solvent and so forth to them, if needed, in order to make a slurry, and then applying this slurry onto a current collector's surface.

As an application method, it is possible to use application methods, such as roll coating methods, dip coating methods, doctor blade methods, spray coating methods and curtain coating methods, which have been used upon manufacturing electrodes for secondary battery.

An active material being used in the present invention has a powdery configuration. The aforementioned active material is applied onto and is fixed on the surface of a current collector via the binder resin. As for the size of a powder, it is preferable that a particulate diameter of that powder can be 10 μm or less.

It is preferable that mixing proportions between the binder resin, an active material and a conductive additive in the electrode layer can be the active material: the conductive additive: the binder resin=30:40:30-95:2:3. Note that these mixing proportions represent the respective upper limits and lower limits. For example, in the case of an active material, the upper limit is 95% by mass, and the lower limit is 30% by mass. It is preferable that an applied thickness of the electrode layer can be 10 μm-150 μm.

The curing step is a step of fixing the active material on the current collector by curing the binder resin. It is allowable that the curing of the binder resin can be carried out in compliance with the curing conditions for the binder resin to be employed, and it is preferable to heat it at 120-350° C. in a nonoxidizing atmosphere. As for a nonoxidizing atmosphere, it is allowable to set up depressurized states in which the oxygen concentrations are made lower to such an extent that oxidation reactions do not progress; or inert-gas atmospheres, such as nitrogen or argon; and so forth.

EXAMPLES

Hereinafter, the present invention will be explained in more detail while giving examples.

Lithium-ion secondary batteries, in which one of the sulfur-modified polyacrylonitriles was used as the positive-electrode active material, were manufactured, and their characteristics were evaluated.

Preparation of Sulfur-modified Polyacrylonitrile

The following were adapted into starting materials: 1.0 g of a sulfur powder with 50-μm average particle diameter; and 0.50 g a polyacrylonitrile powder whose average particle diameter was 1 μm. Note that the average particle diameter of the sulfur powder was one which was obtained by classifying it with use of a sieve, whereas the particle diameter of the polyacrylonitrile powder was one which was ascertained by an electron microscope. After these raw-material powders had been mixed well one another, they were formed as a pellet shape with 10 mm in diameter and 5 mm in thickness; and then, after the pelletized formed product had been wrapped with an aluminum foil, the pelletized formed product was closed hermetically and sealed up in an aluminum laminated film by further wrapping it with the aluminum laminated film and then fusion-welding the aluminum laminated film onto it in vacuum.

After putting one, in which the pelletized formed product had been closed hermetically and sealed up in the aluminum laminated film by the above-mentioned method, into an autoclave with 200 c.c. in capacity together with 80-mL water, the autoclave was closed hermetically, and was then heated at 270° C. for 6 hours. The pressure inside the autoclave on this occasion was about 3.7 MPa. A pellet-shaped black-colored product was then taken out from within the aluminum laminated film after cooling it. This one was labeled a product according to Sample No. 1.

Regarding the obtained product according to Sample No. 1, a Raman analysis was carried out with use of "LabRAM ARAMIS" manufactured by HORIBA SEISAKUSHO corporation. An obtained Raman spectrum is shown in FIG. 1.

In FIG. 1, the horizontal axis represents Raman shift ($cm^{-1}$), and the longitudinal axis represents relative intensity. As can be seen from FIG. 1, it was turned out according to the results of the Raman analysis on this sample that a major peak exists in the vicinity of 1,330 $cm^{-1}$, and the other peaks exist in the vicinity of 1,561 $cm^{-1}$, 1,512 $cm^{-1}$, 1,447 $cm^{-1}$, 1,150 $cm^{-1}$, 996 $cm^{-1}$, 942 $cm^{-1}$, 802 $cm^{-1}$, 474 $cm^{-1}$, 391 $cm^{-1}$, 365 $cm^{-1}$ as well as 305 $cm^{-1}$ in a range of 200 $cm^{-1}$-2,000 $cm^{-1}$.

In the above-mentioned Raman spectrum on Sample No. 1, C—S, N—S and S—S bonds, which should have appeared in general in a range of 500-750 $cm^{-1}$, are not appreciated. This fact is presumed that the peak positions have shifted because of being affected by the unsaturated bonds of carbon and nitrogen (C=C, and C=N bonds) that derive from polyacrylonitrile.

Regarding this product according to Sample No. 1, an X-ray diffraction measurement was carried out by means of a powder X-ray diffraction apparatus (Model Number: M06XCE, a product of MAC Science Corp.) using the CuK α ray. The measurement conditions were set as follows: voltage: 40 kV; electric current: 100 mA; rate of scanning: 4°/min.; sampling: 0.02°; and number of accumulations: once in a range of 10°-60° by diffraction angle (2θ).

Figure 2:
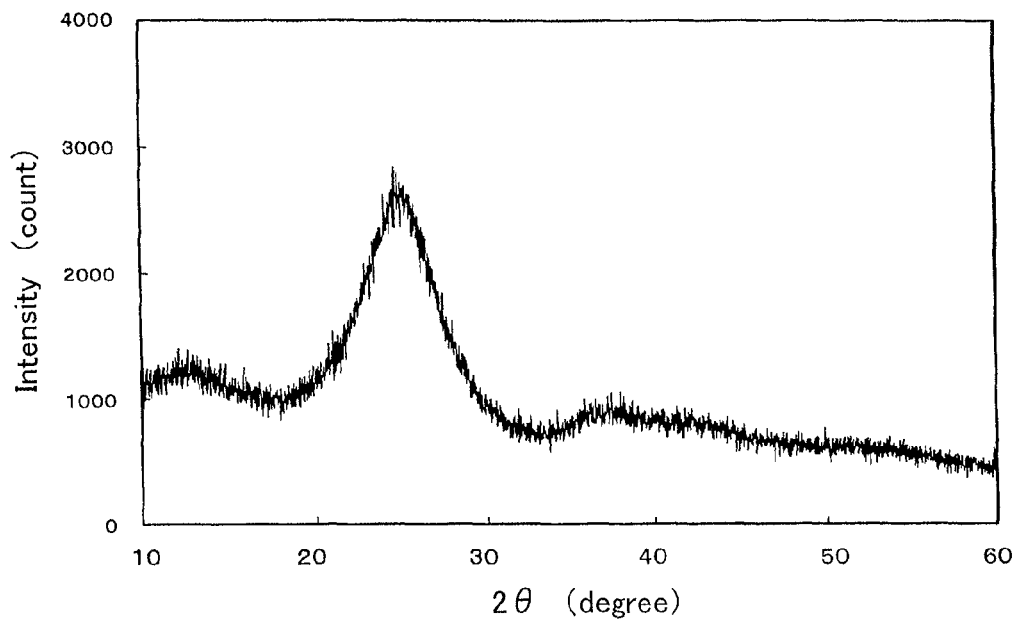
FIG. 2 is a diagram that illustrates an X-ray diffraction pattern of the sulfur-modified polyacrylonitrile that was used in Example No. 1.

A diffraction pattern being obtained by means of the X-ray diffraction measurement was shown in FIG. 2. As a result, only a broad peak, which exhibited a peaks position in the vicinity of 25°, was observed in a range in which the diffraction angle (2θ) was 20°-30°.

In addition, regarding the above-mentioned product according to Sample No. 1, a thermogravimetric-differential thermal analysis was carried out with use of a thermal analysis instrument (Model Number: Thermo Plus TG8120), which was manufactured by RIGAKU CORPORATION, by means of measuring the relationship between temperature and weight change by carrying out heating at a temperature increment rate of 20° C./min. while flowing a high-purity nitrogen gas at a flow volume of 0.15 liter/min.

As a result, in the sulfur simple substance, the weight decrease was appreciated even from the vicinity of 120° C., and the weight decreased sharply when it came to 200° C. or more; whereas it was understood that the product according to Sample No. 1 being obtained by the above-mentioned process was such a stable compound that the weight decrease was less up to and around 400° C. (the weight decrease until 400° C.: about 10%) and even the weight decrease up to and around 600° C. was 20% approximately.

Example No. 1

The aforementioned sulfur-modified polyacrylonitrile according to Sample No. 1 was employed for a positive-electrode active material, and acetylene black (e.g., HB-100 produced by DENKI KAGAKU KOGYO) was employed for a conductive additive. As to a binder resin, a polyimide resin, a product of I.S.T., was used.

These were weighed out so that the y made a proportion, the positive-electrode active material: the conductive additive: the binder resin=60:20:20 by % by mass, and they were put in a container. Then, stirring and mixing were carried out using a rotation/revolution mixer (e.g. , ARE-250 manufactured by THINKY) while carrying out a viscosity adjustment by employing N-methyl-2-pyrrolidone (one of the battery grades produced by KISHIDA KAGAKU) for a dispersant, thereby preparing a uniform slurry.

The thus prepared slurry was coated onto a 20-μm aluminum foil making use of an applicator, and was then heated by a drier at 140° C. for 3 hours, thereby obtaining a positive electrode according to Example No. 1.

A negative electrode was made by means of punching out a 500-μm metallic lithium foil to 14 mm in diameter.

As for an electrolytic solution, a solution was used, solution in which $LiPF_6$ was dissolved in an amount of 1.0 mol/L in a mixed solvent in which a mass ratio between ethylene carbonate and diethyl carbonate was 1:1.

The aforementioned positive electrode and negative electrode were laminated within a member comprising a stainless-steel container for CR2032-type coin battery, a product of HOSEN Co. Ltd., by way of a separator (e.g., Celgard2400), which comprises a polypropylene microporous membrane having 25 μm in thickness, and a glass nonwoven filter having 500 μm in thickness, inside a dry room; and then they were closed hermetically in it by a crimping machine after injecting the electrolytic solution into it, thereby making a CR2032-type coin-battery-shaped lithium-ion secondary battery.

Example No. 2

Other than doing the heating by a drier at 120° C., a positive electrode according to Example No. 2 was made in the same manner as Example No. 1, and the battery making was carried out in the same manner as Example No. 1.

Example No. 3

Other than weighing out the positive-electrode active material, the conductive additive and the binder resin so as to make a ratio, 75:15:10 by % by mass, in this order and doing the heating by a drier at 200° C., a positive electrode according to Example No. 3 was made in the same manner as Example No. 1, and the battery making was carried out in the same manner as Example No. 1.

Comparative Example No. 1

Except that polyvinylidene fluoride, which have been employed for current lithium-ion secondary batteries, substituted for the species of binder, a positive electrode according to Comparative Example No. 1 was made likewise as Example No. 1, and the battery making was carried out in the same manner as Example No. 1.

Characteristic Evaluation

Charging/discharging was carried out onto these batteries, in which the positive electrode according to Example No. 1, the positive electrode according to Example No. 2, the positive electrode according to Example No. 3 and the positive electrode according to Comparative Example No. 1 were used, with an electric-current value that was equivalent to 60 mA per 1 g of the positive-electrode active materials (e.g., being equivalent to 0.1 C by hour rate). On that occasion, a discharge cut-off voltage was set at 1.0 V, and a charge cut-off voltage was set at 3.0 V.

Figure 3:
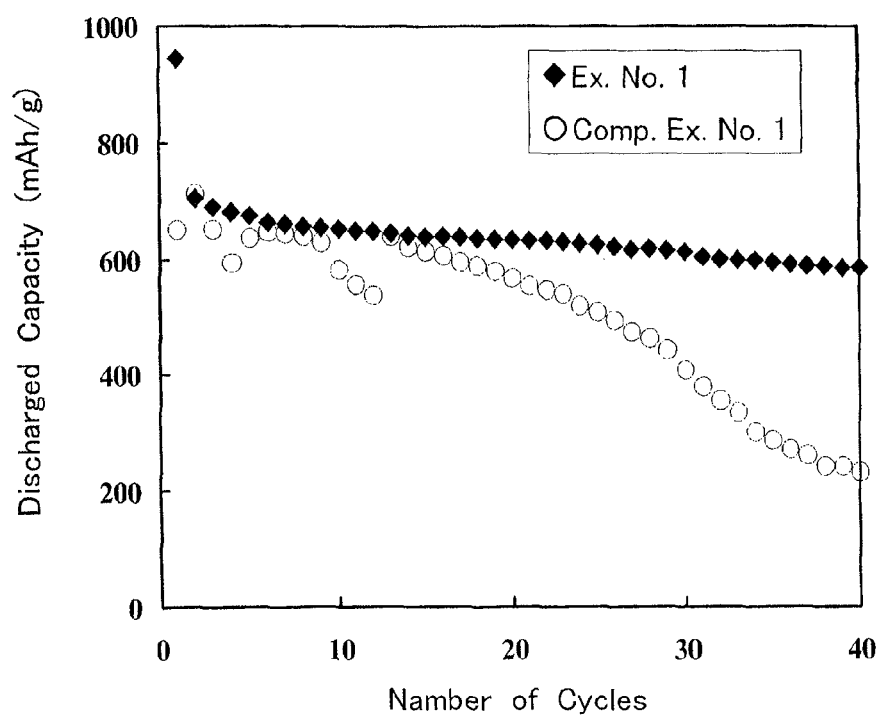
FIG. 3 is a graph that illustrates measurement results of cyclabilities in Example No. 1 and Comparative Example No. 1.
Figure 4:
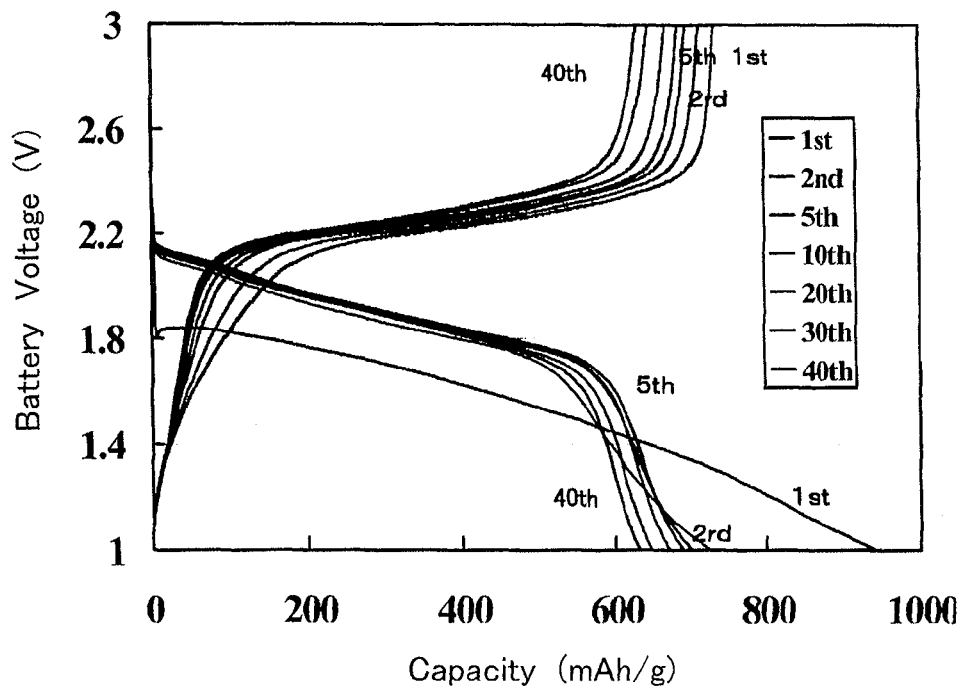
FIG. 4 is a graph that illustrates results of a charging/discharging test in Example No. 1.
Figure 5:
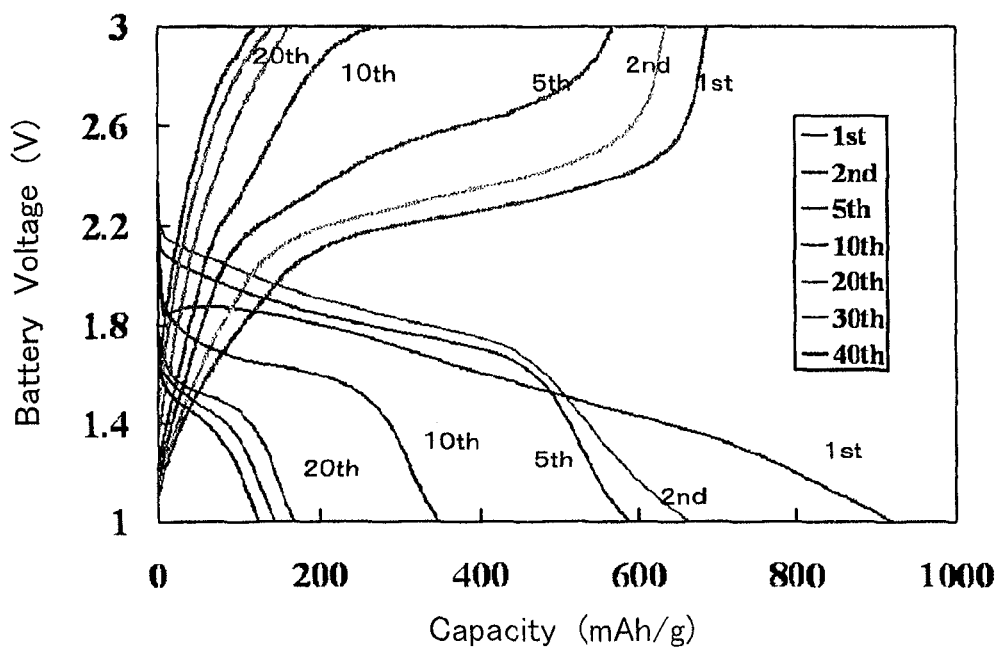
FIG. 5 is a graph that illustrates results of a charging/discharging test in Comparative Example No. 1.
Figure 6:
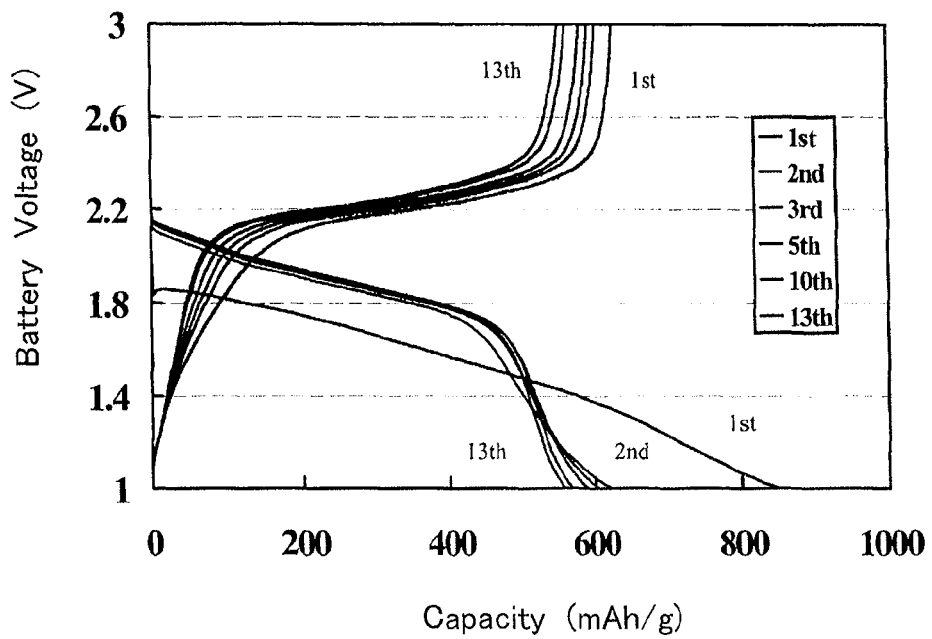
FIG. 6 is a graph that illustrates results of a charging/discharging test in Example No. 2.
Figure 7:
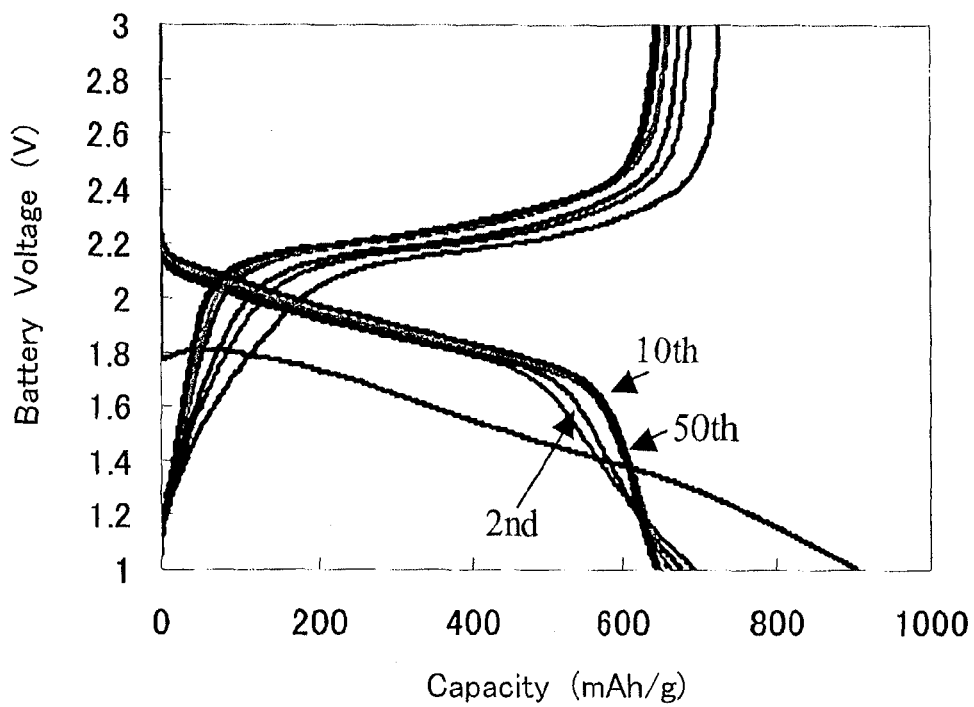
FIG. 7 is a graph that illustrates results of a charging/discharging test in Example No. 3.

Cyclabilities of the batteries, in which the positive electrode according to Example No. 1 and the positive electrode according to Comparative Example No. 1 were used, are shown in FIG. 3. Charging/discharging curves when the positive electrode according to Example No. 1 was used are shown in FIG. 4. Charging/discharging curves when the positive electrode according to Comparative Example No. 1 was used are shown in FIG. 5. Charging/discharging curves when the positive electrode according to Example No. 2 was used are shown in FIG. 6. Charging/discharging curves when the positive electrode according to Example No. 3 was used are shown in FIG. 7.

As can be understood from FIG. 3, the discharged capacity showed a value that fell somewhat below 600 mAh/g at the fortieth cycle number in the battery in which the positive electrode according to Example No. 1 whose binder resin was the polyimide resin, whereas the discharged capacity declined down to 200 mAh/g approximately at the fortieth cycle number in the battery in which the positive electrode according to Comparative Example No . 1 whose binder resin was the polyvinylidene fluoride. Thus, the cyclability upgraded greatly in the battery in which the positive electrode according to Example No. 1 was used, compared with that of the battery in which the positive electrode according to Comparative Example No. 1 was used.

Looking at the charging/discharging curves set forth in FIG. 4 and FIG. 5, no great decrease in the capacity was seen, as set forth in FIG. 4, in the battery in which the positive electrode according to Example No. 1 was used in which the polyimide resin was used for the binder resin even when it underwent the cycles repeatedly. On the contrary, it was understood that, in the battery in which the positive electrode according to Comparative Example No. 1 was used in which the polyvinylidene fluoride was used for the binder resin, the resistance became larger as it underwent the cycles repeatedly because the capacity decreased monotonously since the second cycle and later on.

Looking at FIG. 6 that sets forth the charging/discharging curves of the battery in which the positive electrode according to Example No. 2 was used, no great decrease in the capacity was seen even when it underwent the cycles repeatedly in the same manner as the charging/discharging curves of the battery in which the positive electrode according to Example No. 1 was used, charging/discharging curves which are set forth in FIG. 4. From this result, it was understood that the cyclability upgrades even when the heating temperature of polyimide resins, one of the species of binder resins, is set at 120° C. Moreover, looking at FIG. 7 that sets forth the charging/discharging curves of the battery in which the positive electrode according to Example No. 3 was used, no great decrease in the capacity was seen even at the fiftieth cycle. In Example No. 3, the blending amount of the binder resin was decreased to a half of that in Example No. 1 and Example No. 2. However, in Example No. 3, the heating temperature of the binder resin was set at 200° C., a temperature that is higher than those in Example No. 1 and Example No. 2.

The binder resin according to Example No. 1, Example No. 2 and Example No. 3 was one of polyimide resins. A recommended curing temperature for polyimide resins is 400° C. It is said that the imidization reaction starts at 150° C. or more and is likely to proceed at 200° C. or more. From the charging/discharging curves in FIG. 4, FIG. 6 and FIG. 7, it was understood that no great decrease in the capacity is seen as the cycles are repeated one after another when the heating temperature is 120° C. or more. It was understood from this fact that, in the same manner as the battery in which the positive electrode according to Example No. 1 was used, the batteries in which the positive electrodes according to Example No. 2 and Example No. 3 in which the polyimide resin was used for the binder resin exhibited upgraded cyclabilities, compared with that of the battery in which the positive electrode according to Comparative Example No. 1 was used, positive electrode in which the polyvinylidene fluoride was employed for the binder resin.

Figure 8:
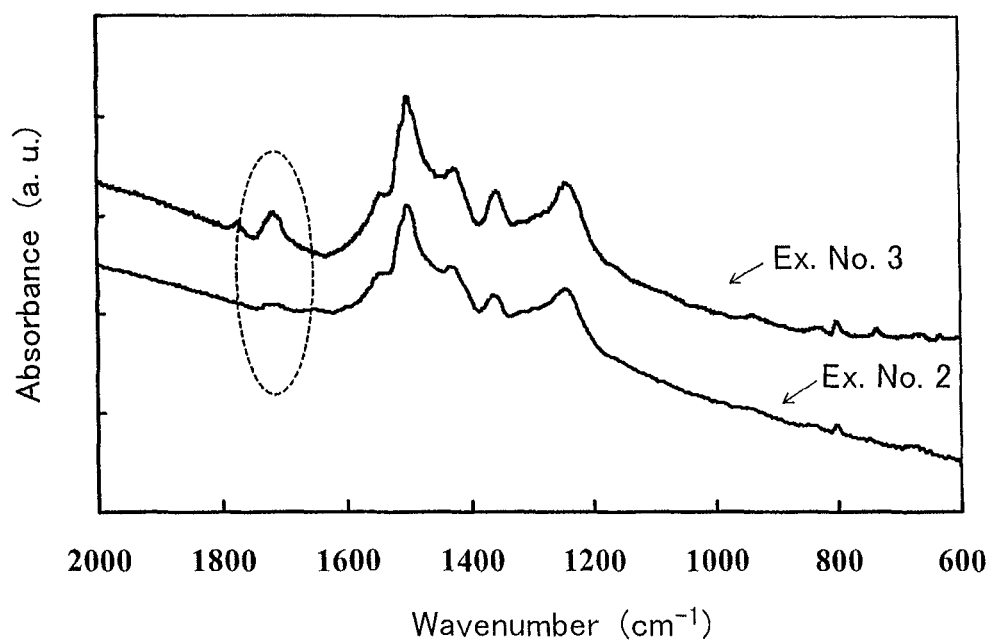
FIG. 8 is a graph that illustrates measurement results by Fourier transformation infrared spectroscopy (or FT-IR) for Example No. 2 and Example No. 3.

Results of FT-IR measurement for Example No. 2 and Example No. 3 are illustrated in FIG. 8. In FIG. 8, the parts being surrounded by the ellipse represent the peaks of imide group. In FIG. 8, it is possible to clearly ascertain the peak of imide group for Example No . 3. Moreover, it is possible to ascertain the peak of imide group even for Example No.2. From these facts, it was possible to ascertain that imide groups can be made when the heating temperature is 120° C. or more.

Moreover, from the charging/discharging curves in FIG. 7, it was understood that, although the blending amount of the binder resin is reduced, no great decrease in the capacity is seen even when the cycles are repeated one after another, because the heating temperature is heightened suitably in compliance with the blending amount of the binder resin. When it is possible to reduce the blending amount of the binder resin, it is possible to increase the blending amount of the active material relatively, and so it is possible to raise the electric capacity of the resulting positive electrode.

Note that, although the polyimide resin was used as the binder resin in the examples, substituting other conditions suitably for the conditions, such as the curing temperatures and so forth, makes it possible to prepare the aforementioned positive electrode even when polyamde-imide resins are used. The obtained positive electrodes can make it possible to obtain the same advantages as those of the examples.

Even when the binder resin includes at least one of the following: at least one of a polymer being selected from the group consisting of polyvinylidene fluoride, polytetrafluoroethyelen, styrene-butadiene rubber, amorphous polyether, polyacrylamide, poly-N-vinylacetamide, polypropylene, polyethylene, polyaniline, and polypyrole; a constituent monomer of aforementioned polymer; and a copolymer of aforementioned constituent monomer and another monomer; as well as a compound being formed by means of crosslinking any of aforementioned polymer, aforementioned constituent monomer, and aforementioned copolymer, it is possible to prepare the aforementioned positive electrode by suitably substituting other conditions for the conditions, such as the curing temperatures and so forth. The obtained positive electrodes can make it possible to obtain the same advantages as those of the examples.

The invention claimed is:

1. A positive electrode for a lithium-ion secondary battery, comprising: a current collector; and an electrode layer that is formed on a surface of said current collector, wherein the electrode layer comprises a binder resin, an active material and a conductive additive, said active material comprising a sulfur-modified polyacrylonitrile that is produced from a raw-material powder comprising a sulfur powder having a particle diameter of about 40 μm-150 μm and a polyacrylonitrile powder having a particle diameter of about 0.5 μm-50 μm, wherein the raw-material powder is heated in an enclosed nonoxidizing atmosphere; and said binder resin includes a polyimide resin and/or a polyamide-imide resin.

2. The positive electrode for lithium-ion secondary battery as set forth in claim 1, wherein said binder resin includes a polyimide resin and/or a polyamide-imide resin in an amount of 50% by mass or more.

3. The positive electrode for lithium-ion secondary battery as set forth in claim 1, wherein a temperature of said heating is 250-500° C.

4. The positive electrode for lithium-ion secondary battery as set forth in claim 3, wherein said active material is one from which unreacted sulfur has been removed by further heating said sulfur-modified polyacrylonitrile, which has been produced, at 150-400 ° C. in a nonoxidizing atmosphere after said heating.

5. The positive electrode for lithium-ion secondary battery as set forth in claim 1, wherein said sulfur-modified polyacrylonitrile exhibits the following in a Raman spectrum in a range of 200 cm$^{-1}$-2,000 cm$^{-1}$ according to the Raman shift:

a major peak existing at around 1,330 cm$^{-1}$; and other peaks existing at around 1,561 cm$^{-1}$, 1,512 cm$^{-1}$, 1,447 cm$^{-1}$, 1,150 cm$^{-1}$, 996 cm$^{-1}$, 942 cm$^{-1}$, 802 cm$^{-1}$, 474 cm$^{-1}$, 391 cm$^{-1}$, 365 cm$^{-1}$, and 305 cm$^{-1}$.

6. The positive electrode for lithium-ion secondary battery as set forth in claim 1, wherein said binder resin includes at least one of the following:

at least one of a polymer being selected from the group consisting of polyvinylidene fluoride, polytetrafluoroethyelen, styrene-butadiene rubber, amorphous polyether, polyacrylamide, poly-N-vinylacetamide, polypropylene, polyethylene, polyaniline, and polypyrole;

a constituent monomer of said polymer; and a copolymer of said constituent monomer and another monomer; as well as a compound being formed by means of crosslinking any of said polymer, said constituent monomer, and said copolymer.

7. A lithium-ion secondary battery comprising the positive electrode of claim 1.

8. The positive electrode for lithium-ion secondary battery as set forth in claim 1, wherein the binder resin consists of a polymide resin and/or a polyamide-imide resin.

* * * * *